(12) United States Patent
Kawabe

(10) Patent No.: US 7,233,549 B2
(45) Date of Patent: Jun. 19, 2007

(54) STORAGE APPARATUS AND ITS FOCUS CONTROL METHOD

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 378 days.

(21) Appl. No.: 10/663,867

(22) Filed: Sep. 16, 2003

(65) Prior Publication Data
US 2004/0062157 A1 Apr. 1, 2004

Related U.S. Application Data

(63) Continuation of application No. PCT/JP01/02808, filed on Mar. 30, 2001.

(51) Int. Cl.
*G11B 7/00* (2006.01)

(52) U.S. Cl. .................. 369/44.35; 369/44.27; 369/44.35

(58) Field of Classification Search ............... None
See application file for complete search history.

(56) References Cited

FOREIGN PATENT DOCUMENTS

| JP | 60-247831 | 12/1985 |
|---|---|---|
| JP | 04028020 | * 1/1992 |
| JP | 04345924 | * 12/1992 |
| JP | 7-282455 | 10/1995 |
| JP | 8-249678 | 9/1996 |
| JP | 11-306551 | 11/1999 |
| JP | 11306551 | * 11/1999 |

* cited by examiner

*Primary Examiner*—Tan Dinh
*Assistant Examiner*—Jorge L. Ortiz-Criado
(74) *Attorney, Agent, or Firm*—Greer, Burns & Crain, Ltd.

(57) ABSTRACT

A focus search control unit for outputting an order to move an objective lens to the vicinity of a targeted position is provided with a trajectory generating unit for generating a position trajectory to move the objective lens such that the objective lens approaches the targeted position gradually. The position trajectory output from the trajectory generating unit is a position trajectory with which resonance frequency components that the lens moving unit has are removed or attenuated by making smooth the variation of acceleration of the objective lens moved by the lens moving unit. The position trajectory is defined by, for example, a function of third order or higher with respect to time.

3 Claims, 13 Drawing Sheets

PRIOR ART

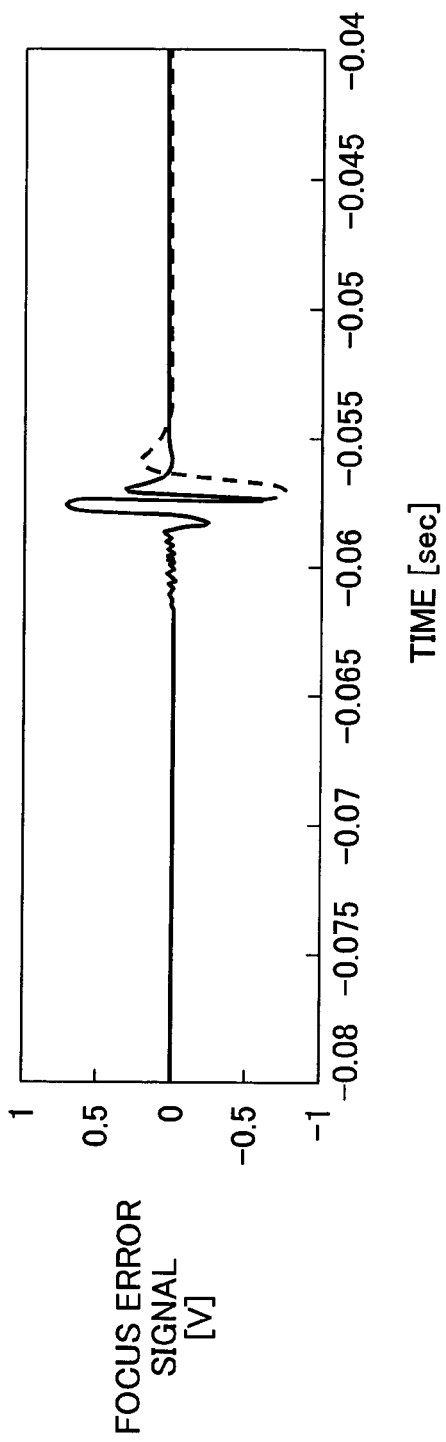

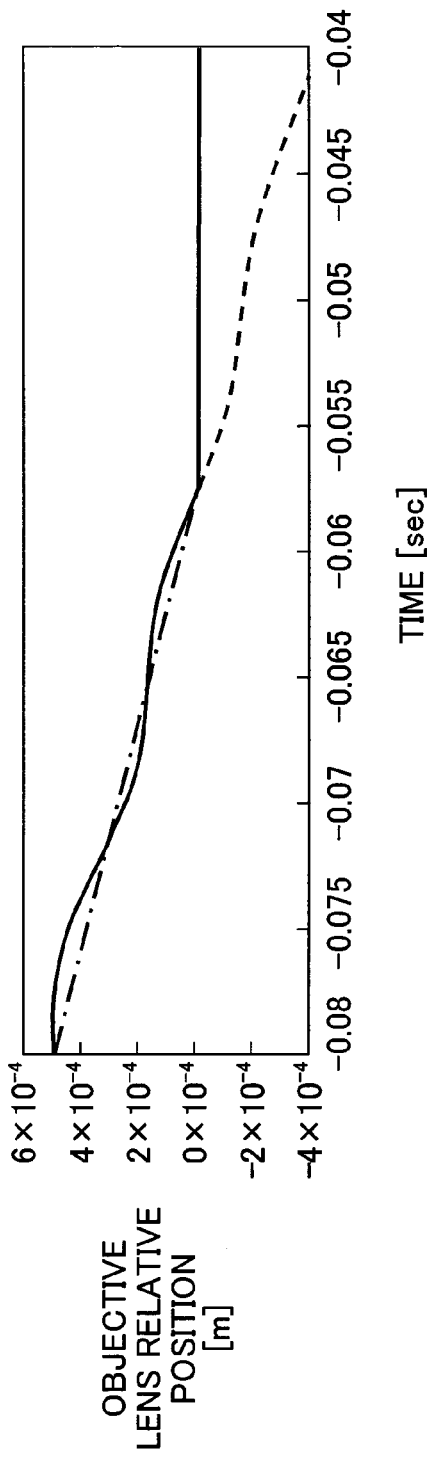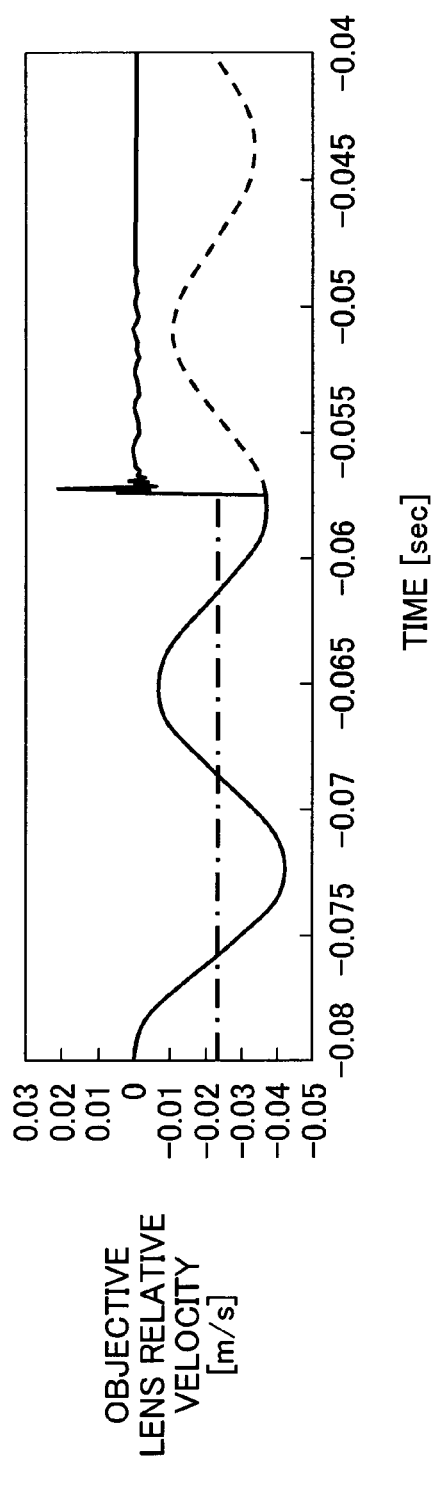
FIG. 5C PRIOR ART
FIG. 5D

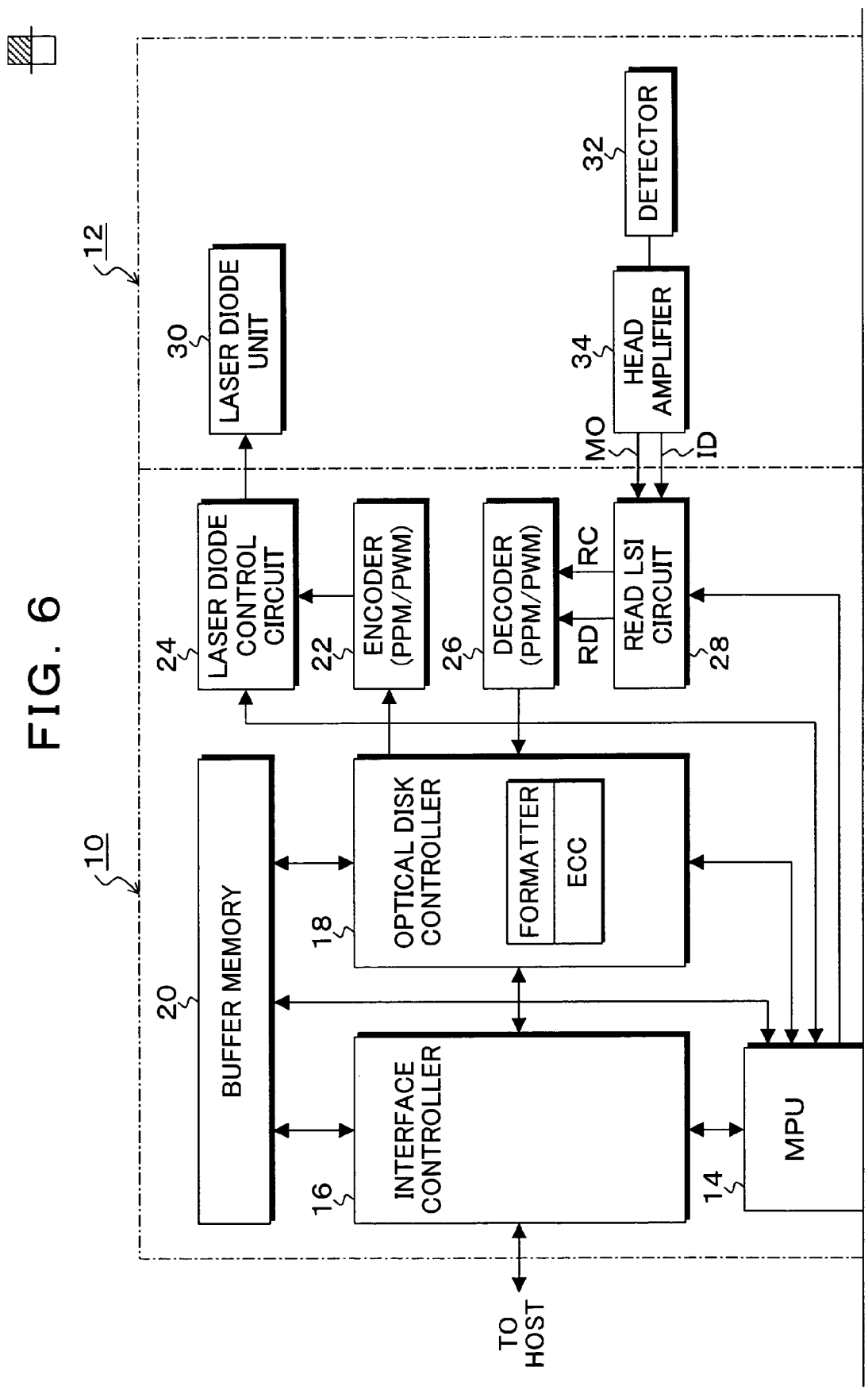

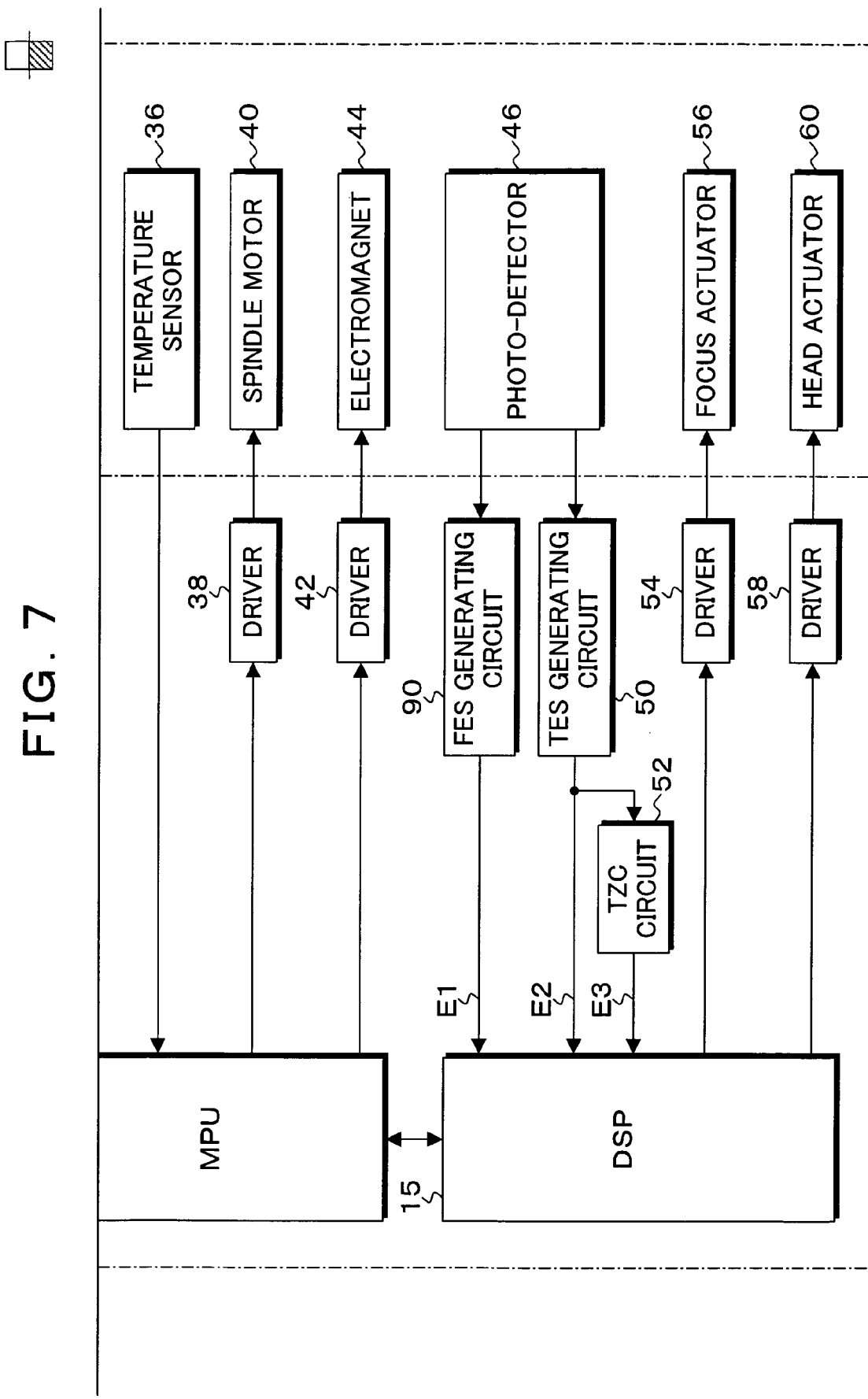

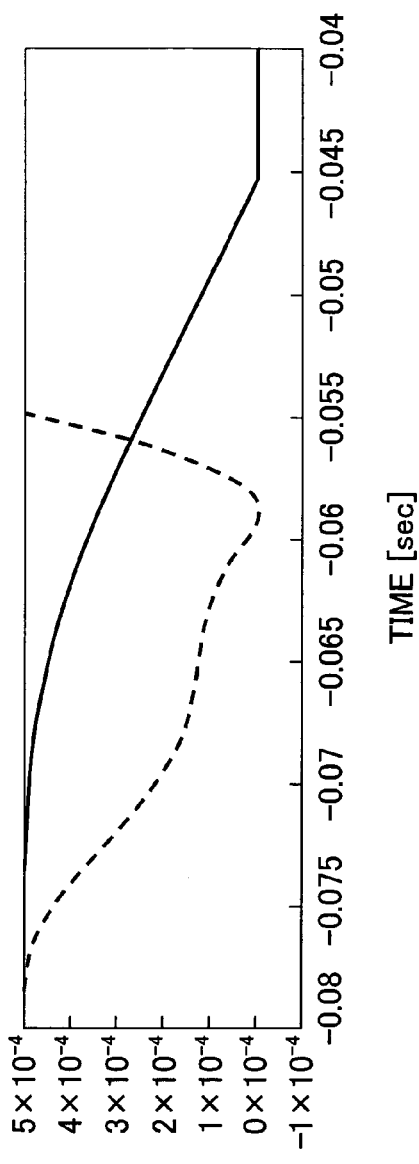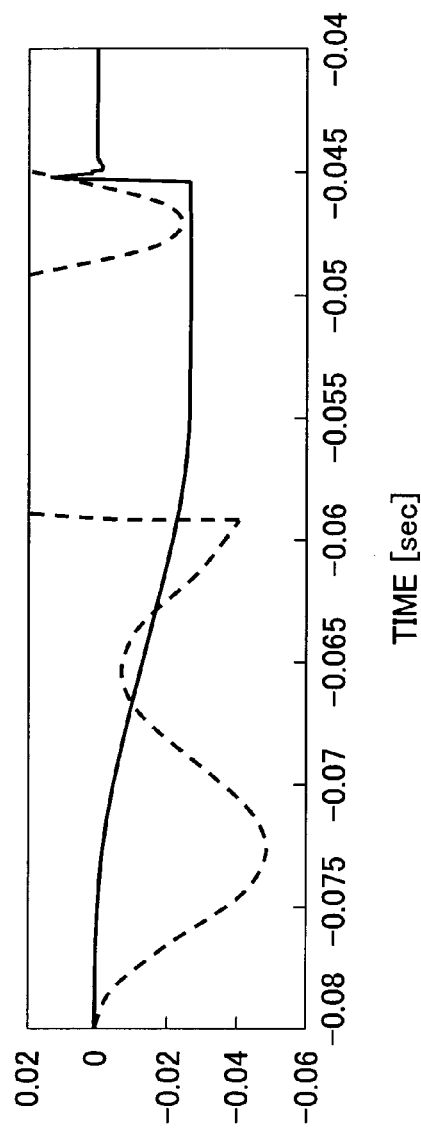
FIG. 10C
FIG. 10D

STORAGE APPARATUS AND ITS FOCUS CONTROL METHOD

This is a continuation of International PCT Application No. PCT/JP01/02808 filed Mar. 30, 2001.

TECHNICAL FIELD

The present invention relates to a storage apparatus for recording and/or reproducing information on a disk track and a focus control method of the storage apparatus, and more particularly to a storage apparatus having a focus search control function for drawing an objective lens into the vicinity of its focal position and a focus control method of the storage apparatus.

BACKGROUND ART

In a conventional optical disk apparatus using a cartridge-type optical disk, a focus servo operation is conducted such that the focal point of a laser beam is brought on the surface of a recording film, in order to achieve accurate recording/reproducing. In the focus servo operation, the objective lens is controlled such that the distance between the objective lens and the optical disk is maintained constant by feeding back a focus error signal. However, it is only within a very small region of approximately ±1 μm that the focus error signal can serve as a linear error signal representing a position of the objective lens relative to the position of the optical disk in the direction of the optical axis of the objective lens. Therefore, it is very difficult to mount a mechanism unit precisely within this region in advance. Therefore, it is necessary to conduct a focus search control for moving the objective lens into a linear region of the focus error signal for conducting the focus servo operation when the optical disk has been inserted. Conventionally, the focus search control is conducted in a method in which the objective lens is gradually brought closer to the focusing point from a position sufficiently far away from the linear region of the focus error signal and a focus servo loop is closed when the focus error signal has entered within a predetermined region.

FIG. 1 shows a block diagram illustrating an overview of a focusing mechanism and a focus control system of a conventional optical disk apparatus. An optical disk 264 is rotated around an axis oriented along arrows X—X, by a spindle motor (not shown). A moving head 262 is movable in directions indicated by arrows Y—Y, i.e., in directions along the radius of an optical disk 264 and, in the moving head 262, an objective lens 270 fixed to a lens holder 268 is mounted through, for example, a pair of plate springs 266. A focusing coil 272 is mounted on the lens holder 268 and moves the objective lens 270 in directions indicated by the arrows X—X by an interaction of a magnetic field generated by a permanent magnet (not shown) fixed inside the moving head 262 and a current flowing in the focusing coil 272. A leading mirror 274 reflects a beam from a fixed head 276 emitted along the direction of the radius of the optical disk 264, in the direction along the axis of the optical disk 264. The beam is gathered by the objective lens 270 onto the surface of the recording film of the optical disk 264. The beam reflected from the optical disk 264 is again reflected by the leading mirror 274 and returned to the fixed head 276.

The fixed head 276 has inside it a laser diode 278, a collimator lens 280, a beam splitter 284, a detector lens 286 and a photo-detector 288. A laser beam emitted from the laser diode 278 is reflected by the beam splitter 284 through the collimator lens 280 and injected into the moving head 262. An outgoing beam from the moving head 262 passes through the beam splitter 284 and is gathered on the photo-detector 288 through the detector lens 286. The photo-detector 288 comprises, for example, a quarter-splitting photodiode and the current being output from the photo-detector 288 is converted to a focus error signal by a focus error signal generating circuit 290.

The focus error signal generally has a shape shown by the dotted line in FIG. 2 and is generated as a signal called S-shaped curve signal when the laser beam from the objective lens 270 has been focused on the surface of the recording film of the optical disk 264. The direction of the axis of abscissas in FIG. 2 indicates the direction in which the objective lens 270 leaves the optical disk 264 relative to the position of the focal point 312. Now, a portion between a point 310 and a point 314 in FIG. 2, i.e., a portion being almost linear between the peaks of the S-shape of the focus error signal can be used as an error signal between the objective lens 270 and the position of the focal point 312. When conducting a focus search, the objective lens 270 is positioned at a position sufficiently away from the focusing position 312 as an initial state. For example, when the objective lens 270 at the balanced position of the plate springs 266 is present in the vicinity of the position of the focal point, the objective lens 270 is brought away from the vicinity of the position of the focal point by ordering a focus current driving circuit 304 to flow a driving current of the focusing coil 272. When the objective lens 270 at the balanced position of the plate springs 266 is present sufficiently away from the position of the focal point, it is enough that a zero (0) is input in the focus current driving circuit 304. At this moment, an initial current value is designated by a ramp circuit 300 and a selection circuit 302 is in a state in which it has selected an output of the ramp circuit 300.

When the focus search has been started, a linear function signal for time is output from the ramp circuit 300 and the current of the focusing coil 272 is controlled by the focus current driving circuit 304 through the selection circuit 302 such that the objective lens 270 approaches to the position of the focal point 312 at a constant velocity. Since a focus actuator having the focusing coil 272 has a frequency characteristic that a displacement in proportion to a DC current is output in response to the DC current, the focus actuator is displaced in a linear function for an input time period as ordered by the ramp circuit 300. Therefore, the objective lens 270 approaches the position of the focal point at a constant velocity and, thereafter, at the vicinity of the position of the focal point, the S-shaped curve portion of the focus error signal as shown in FIG. 2 is output from the focus error signal generating circuit 290.

Then, first, a first comparator 294 monitors the focus error signal and, when this signal exceeds such a predetermined voltage level as indicated by a point 306 in FIG. 2, the first comparator 294 outputs to a second comparator 296 an order to start an operation. Then, the second comparator 296 monitors the focus error signal and, when the signal becomes lower than a predetermined voltage level indicated by a point 308, the second comparator 296 outputs to a third comparator 298 an order to start an operation. Then, the third comparator 298 monitors the focus error signal and, when the signal becomes lower than a voltage level corresponding to the position of the focal point being the point 312, the third comparator 298 outputs an order to the selection circuit 302 to switch. At this moment, an input to the focus current driving circuit 304 is switched from the output of the ramp circuit 300 to the output of a phase compensation circuit 292. In the phase compensation circuit 292, the focus error signal for the vicinity of the focus point, i.e., a position error signal of the objective lens 270 is input and is applied with a phase compensation filtering process and a gain process such as advancing or delaying the phase such that the control system becomes stable when the loop is closed and, therefore, a focus servo control system is formed that works for the objective lens 270 to be always positioned at the position of the focal point. When such a focus search control is conducted, the order from the ramp circuit 300 is an order to move the objective lens 270 at a constant velocity. However, in this method, at the start of the focus search, since the velocity is varied stepwise, the acceleration has an impulse-like shape. This is shown in FIG. 3. The axes of abscissas in FIGS. 3A, 3B and 3C represent time and axes of ordinate represent respectively the displacement of the objective lens in FIG. 3A, the velocity of the objective lens in FIG. 3B and the acceleration of the objective lens in FIG. 3c. At a time zero (0), the focus search starts and an order of a ramp-like shape current shown in FIG. 3A is output from the ramp circuit 300. At this moment, the velocity of the objective lens 270 shown in FIG. 3B is varied stepwise from zero (0) to $v_0$ and, thus, the acceleration working on the objective lens 270 becomes an impulse signal as shown in FIG. 3C. This means that the acceleration generated by the focus actuator contains a high-frequency component.

FIG. 4 shows a frequency characteristic of the focus actuator. In FIG. 4A, the axis of abscissas represents the frequency and the axis of ordinate represents the gain (sensitivity) of the replacement for a unit current input. In FIG. 4B, the axis of abscissas represents the frequency and the axis of ordinate represents the phase angle. The peak at 70 Hz in the frequency characteristic of the focus actuator indicates the main resonance of the actuator and a constant gain for the current, i.e., a displacement in proportion to the current is output at frequencies lower than this. In contrast, when a current input at 70 Hz is applied, the sensitivity becomes 15 dB or higher comparing to that of current inputs at frequencies of 70 Hz or lower and, therefore, the objective lens starts an oscillation.

This situation is shown in FIGS. 5A to 5D. FIGS. 5A, 5B, 5C and 5D show respectively the focus error signal, the focus current, the relative position and the relative velocity of the objective lens. In FIG. 5B, a point 316 indicates the time when the focus search is started, a point 318 indicates the time when the focus is detected, the solid line indicates a track for the case where the focus servo operation is started at the point 318 and the dotted line indicates a track for the case where the focus servo operation is not started at the point 318. The chain lines in FIGS. 5C and 5D indicate respectively the track of the targeted position and the track of the targeted velocity. It is understood that, even when the focus search current varies in a ramp-like shape as described above, the resonance of the focus actuator considerably influences on a practical position trajectory and the velocity track and, therefore, those tracks are considerably away from the targeted tracks. This considerably influences adversely on a stable focus search. Since the region in which the focus error signal can be used as an error signal is limited, a normal feedback control can not operate if a great overshoot occurs in the response at the time of starting of the focus servo operation due to an influence of the initial velocity exceeding the designed value. Considering that a further narrowing of the region in which the focus error signal can be used is advanced when a short-wavelength light source is employed as a factor in the shift to larger capacities of optical disk apparatuses in the future, this can be said to be a fatal problem.

DISCLOSURE OF THE INVENTION

The object of the invention is to provide a storage apparatus such as an optical disk apparatus having a focus search control function allowing an objective lens to move at a targeted velocity while minimizing the influence of a focus actuator even when the actuator has a resonance, and to provide a focus control method of the storage apparatus.

The present invention provides a storage apparatus comprising a lens moving unit for moving an objective lens in the direction of its optical axis; a focus error detection unit for sensing a targeted position error of the objective lens; a focus search control unit for outputting an order to move the objective lens to the vicinity of a targeted position; a focus servo control unit for causing the objective lens to follow the targeted position; and a trajectory generating unit disposed at the focus search control unit and for generating a position trajectory to move the objective lens such that the objective lens approaches a targeted position gradually, wherein the position trajectory output from the trajectory generating unit is a position trajectory with which resonance frequency components that the lens moving unit has are removed or attenuated by making smooth the variation of acceleration of the objective lens moved by the lens moving unit.

The present invention further provides a storage apparatus comprising a focus actuator for moving an objective lens in the direction of its optical axis; a focus error signal detection circuit for detecting the displacement of the objective lens in the vicinity of its focal point; a focus search control unit for outputting an order to move the objective lens to the vicinity of the focal point; a focus servo control unit for causing the objective lens to follow the position of the focal point; and a trajectory generating unit disposed at the focus search control unit and for generating a position trajectory to move the objective lens such that the objective lens approaches a targeted position gradually, wherein the position trajectory output from the trajectory generating unit is a position trajectory with which resonance frequency components that the lens moving unit has are removed or attenuated by making smooth the variation of acceleration of the objective lens moved by the lens moving unit.

The position trajectory being output from the trajectory generating unit is defined by a function of third or higher order with respect to time. The position trajectory being output from the trajectory generating unit may also be defined by a combination of trigonometric functions. Furthermore, the position trajectory being output from the trajectory generating unit is defined by, more generally, any function of which the second order differential for time is continuous.

As described above, the invention conducts the focus drawing control based on defining the focus search current input into the focus actuator as a targeted track with which the targeted acceleration of the objective lens varies continuously. Therefore, it is possible to prevent the external force of the high-frequency component from working on the focus actuator and the influence of the resonance of the focus actuator can be minimized. Thus, the velocity of the objective lens at the time when the focus point is detected can be adjusted to the predetermined optimal value and a shift to a stable focus servo operation can be achieved.

The present invention also provides a focus control method of an apparatus comprising a lens moving unit for moving an objective lens in the direction of its optical axis, a focus error detection unit for sensing a targeted position error of the objective lens, a focus search control unit for outputting an order to move the objective lens to the vicinity of a targeted position, and a focus servo control unit for causing the objective lens to follow the targeted position, wherein a position trajectory is generated for moving the objective lens such that the objective lens approaches the targeted position gradually, and wherein the position trajectory output from the trajectory generating unit is a position trajectory with which resonance frequency components that the lens moving unit has are removed or attenuated by making smooth the variation of acceleration of the objective lens moved by the lens moving unit.

The present invention further provides a focus control method of an apparatus comprising a focus actuator for moving an objective lens in the direction of its optical axis, a focus error signal detection circuit for detecting the displacement of the objective lens in the vicinity of a focal point, a focus search control unit for outputting an order to move the objective lens to the vicinity of the focal point, and a focus servo control unit for causing the objective lens to follow the position of the focal point, wherein a position trajectory is generated for moving the objective lens such that the objective lens approaches a targeted position gradually, and wherein the position trajectory output from the trajectory generating unit is a position trajectory with which resonance frequency components that the lens moving unit has are removed or attenuated by making smooth the variation of the acceleration of the objective lens moved by the lens moving unit.

BRIEF DESCRIPTION OF DRAWINGS

FIGS. 5A to 5D show time charts of the variation against time of the focus error signal, a focus current, an objective lens relative position and an objective lens relative velocity according to the conventional focus search;

FIG. 6 shows a block diagram of a part of an optical disk drive to which the invention is applied;

FIG. 7 shows a block diagram of the rest of the optical disk drive to which the invention is applied;

FIGS. 10A to 10D show time charts of the focus error signal, the focus current, the objective lens relative position and the objective lens relative velocity according to the focus search of the invention.

BEST MODE FOR CARRYING OUT THE INVENTION

Figure 1:
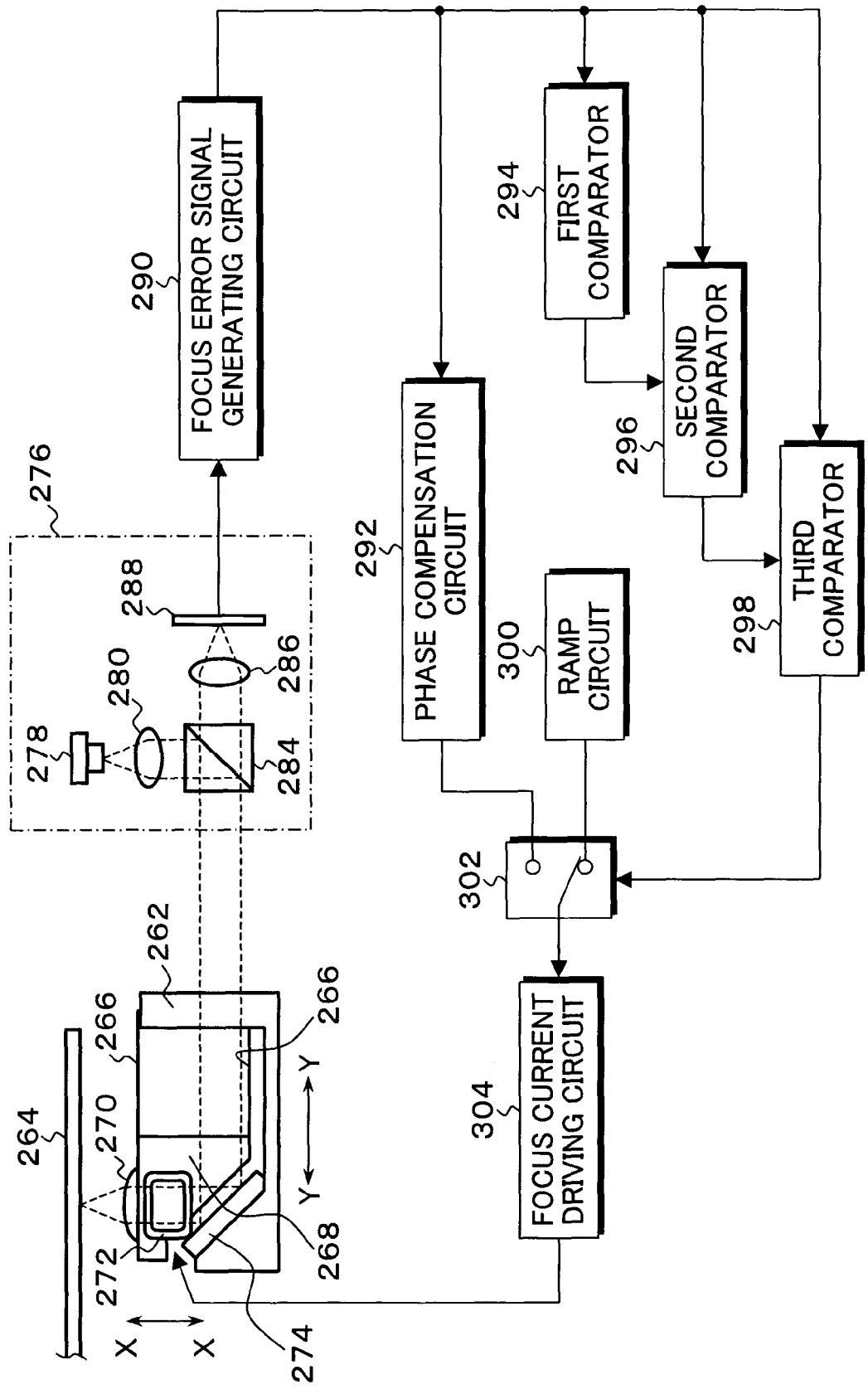
FIG. 1 shows a block diagram of a focus control unit having a focus search control function in a conventional optical disk apparatus.

FIG. 6 and FIG. 7 show block diagrams of an optical disk drive as a storage apparatus of the invention taking an example of a magneto-optical disk (MO) cartridge as a storage medium. The optical disk drive comprises a controller 10 and an enclosure 12. The controller 10 comprises an MPU 14 for the total control, an interface controller 16 for interacting with a host, an optical disk controller (ODC) 18 having a formatter necessary for reading and writing of the medium and an ECC function, and a buffer memory 20. To the optical disk controller 18, an encoder 22, a laser diode control circuit 24 and a laser diode unit 30 are provided as a write-in system. Furthermore, as a read-out system to the optical disk controller 18, a detector 32, a head amplifier 34, a read LSI circuit 28 and a decoder 26 are provided to the optical disk controller 18. The detector 32 receives a returned beam from the magneto-optical disk and outputs an ID signal and an MO signal to the read LSI circuit 28 through the head amplifier 34. The read LSI circuit 28 generates a lead clock and lead data from the ID signal and the MO signal both having been input, and outputs the lead clock and the lead data to the decoder 26. The temperature of the environment inside the apparatus detected by a temperature sensor 36 is input into the MPU 14 and the MPU 14 optimizes the illumination power at the laser diode unit 30 based on the temperature of the environment. Furthermore, the MPU 14 controls a spindle motor 40 through a driver 38 and controls an electromagnet 44 through a driver 42. The electromagnet 44 provides an external magnetic field when recording or erasing is conducted using an MO cartridge and, in the case of Magnetically-induced Super Resolution medium (MSR medium) in an MO cartridge of 1.3 GB, it also provides an external magnetic field when reproducing is conducted. A DSP 15 conducts a servo control operation for positioning an objective lens mounted on a head actuator, at a targeted position relative to the magneto-optical disk based on a servo error signal. The servo control has two (2) functions of a track control for positioning the objective lens at a targeted track position of the medium, and a focus control for controlling the objective lens at a focusing position relative to the medium. The focus control includes a focus search control for drawing in the objective lens to the vicinity of the focusing position when the medium is inserted. Supporting this servo control, a photo-detector 46, a focus error signal generating circuit 90, track error signal generating circuit 50 and a Track Zero-Cross circuit (TZC circuit) 52 are provided. The focus error signal generating circuit 90 generates a focus error signal in, for example, knife-edge method as a focus optical system. For the focus control, the DSP 15 controls the objective lens to move to its focal position by turning on the focus servo operation through the focus search control for drawing the objective lens into the vicinity of its focusing position in the direction of its optical axis by driving a focus actuator 56 using a focus current driving circuit 104. For the track control, the objective lens is positioned at a targeted track center on the medium by driving a head actuator 60 in which VCM is used, by a driver 58.

Figure 2:
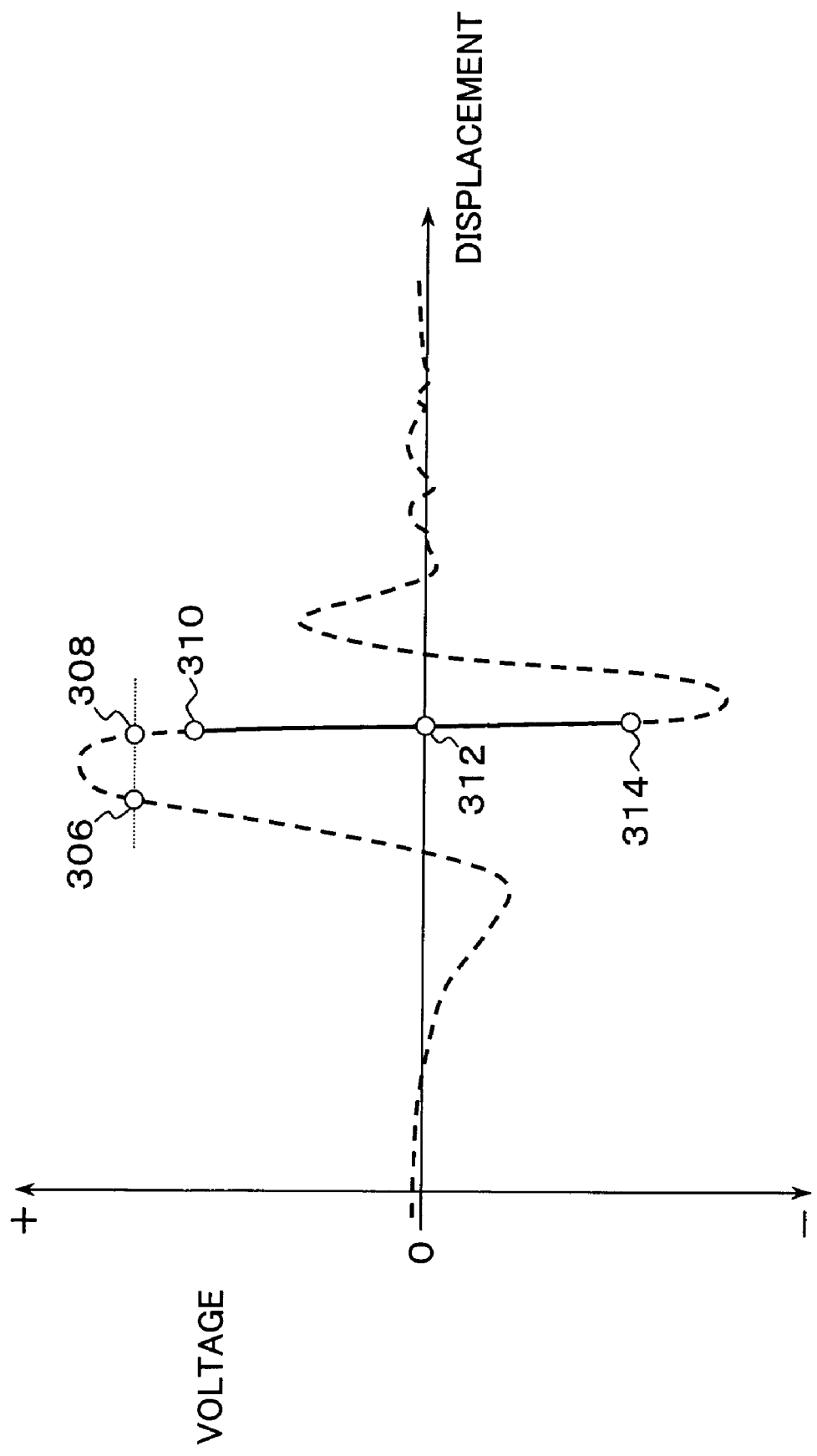
FIG. 2 illustrates a waveform of a focus error signal.
Figure 3A:
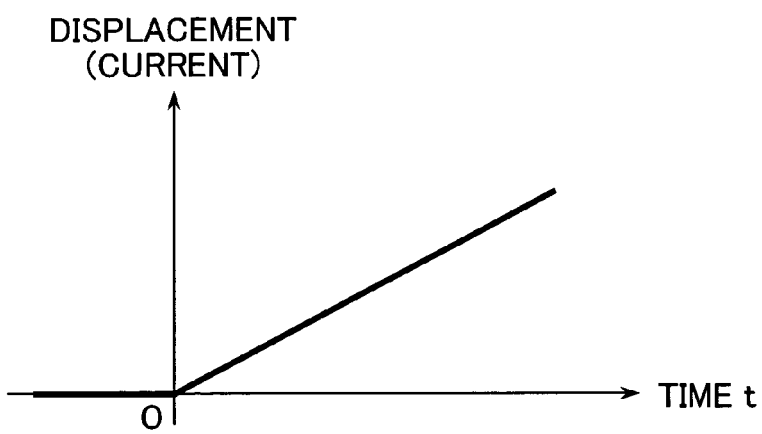
FIGS. 3A to 3C show time charts of displacement, velocity and acceleration according to a conventional focus search shown in FIG. 1.
Figure 3B:
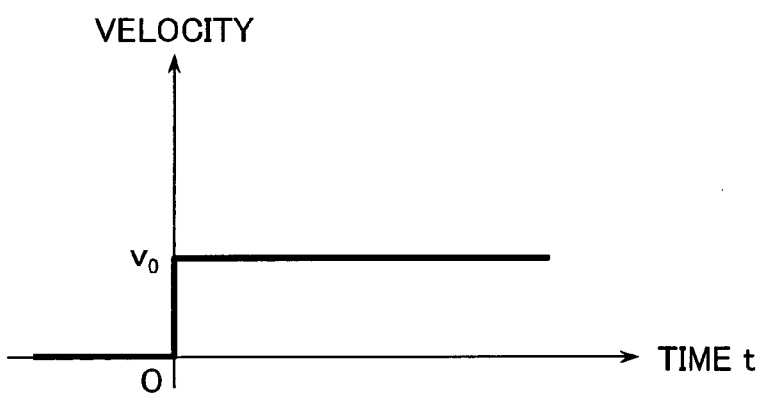
Figure 3C:
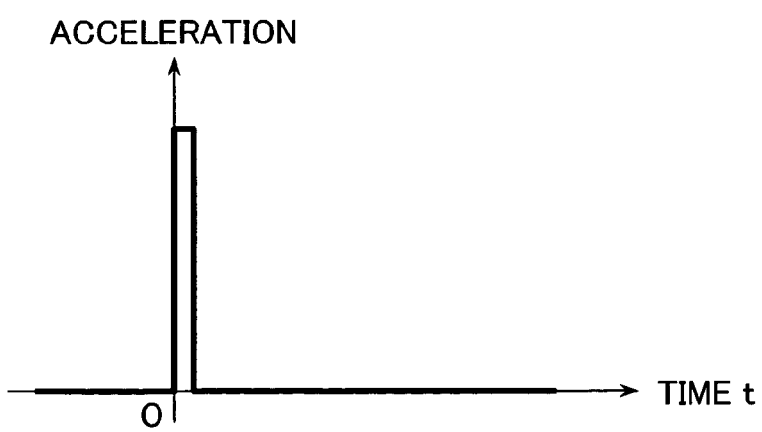
Figure 4A:
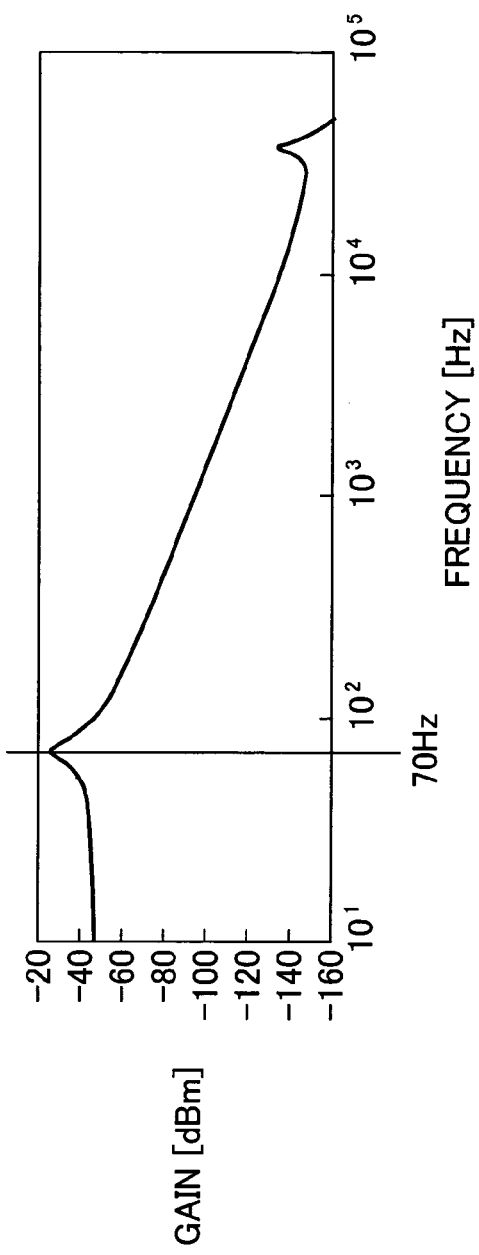
FIGS. 4A and 4B show frequency characteristics of the gain and phase, which result in the mechanical characteristics of a focus actuator.
Figure 4B:
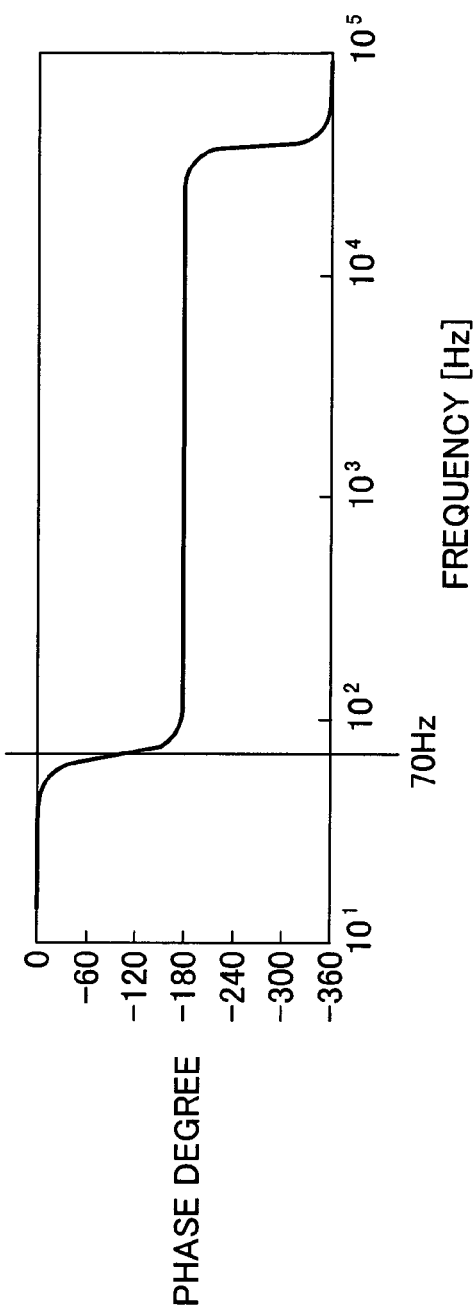
Figure 8:
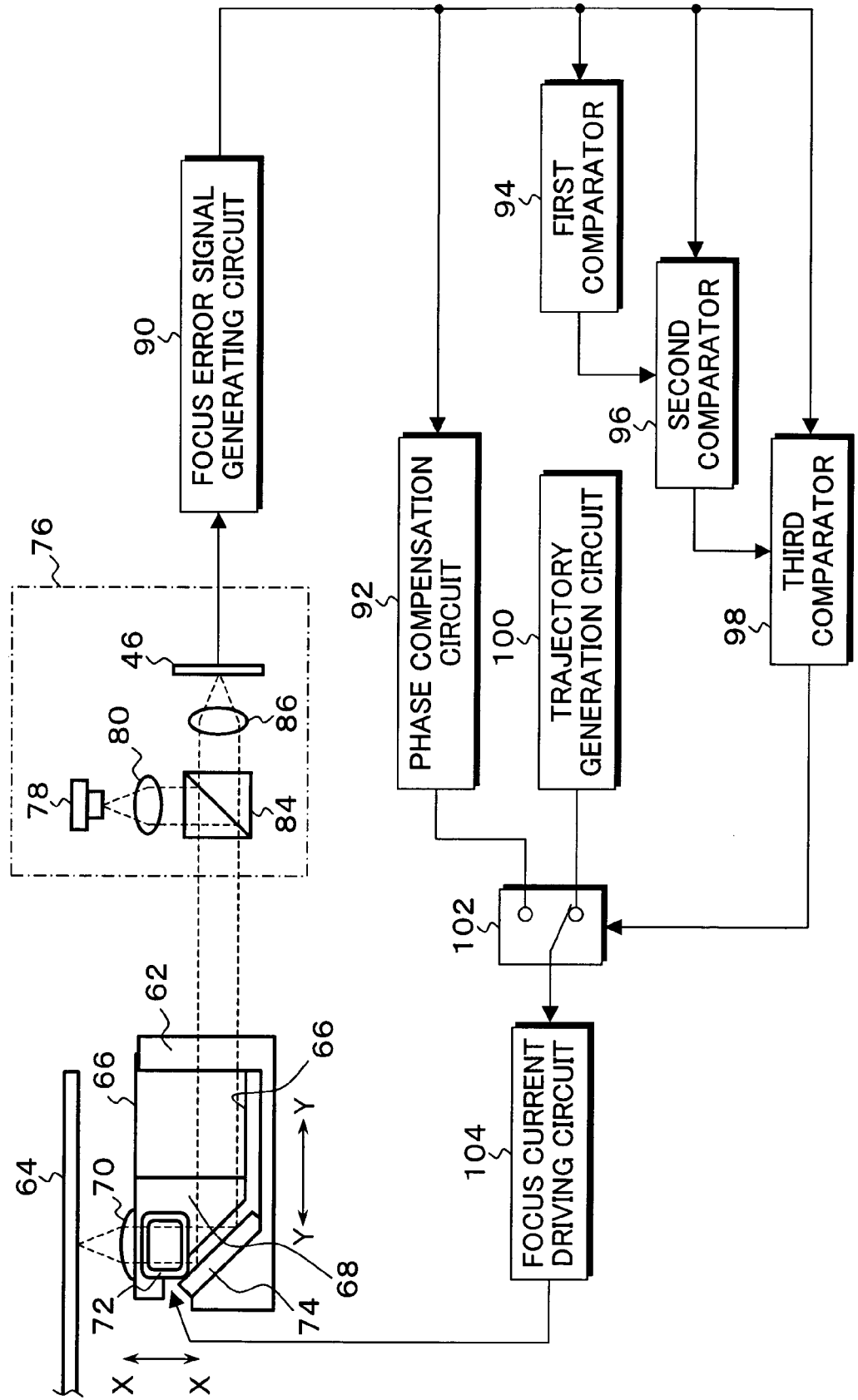
FIG. 8 shows a block diagram of a focus control system having a focus search control function according to the invention.

FIG. 8 shows a block diagram of a focusing mechanism and a focus control system in the optical disk drive shown in FIG. 6 and FIG. 7. An optical disk 64 is rotated by a spindle motor (not shown) with an axis indicated by the arrows X—X. Moving head 62 is movable in the direction indicated by the arrows Y—Y, i.e., the radius of the optical disk 64 and, an objective lens 70 fixed to a lens holder 68 through, for example, a plate spring 66 is mounted inside the moving head 62. A focusing coil 72 is mounted on the lens holder 68 and moves the objective lens 70 in the direction indicated by the arrows X—X utilizing an interaction formed by a magnetic field generated by a permanent magnet, not shown, fixed inside the moving head and a current flowing in the focusing coil 72. A leading mirror 74 reflects a light beam emitted from a fixed head 76 in the direction of the radius of the optical disk 64, into the direction of the axis of the optical disk 64. The light beam is gathered by the objective lens 70 on the surface of the recording film of the optical disk 64. A reflected light beam from the optical disk 64 is again reflected by the leading mirror 74 and returned to the fixed head 76. The fixed head 76 has inside it a laser diode 78, a collimator lens 80, a beam splitter 84, a detector lens 86 and a photo-detector 46. A laser beam emitted from the laser diode 78 is reflected by the beam splitter 84 through the collimator lens 80 and injected into the moving head 62. An outgoing beam from the moving head 62 passes through the beam splitter 84 and is gathered on the photo-detector 46 through the detector lens 86. The photo-detector 46 comprises, for example, a quarter-splitting photodiode and the current being output from the photo-detector 46 is converted by a focus error signal generating circuit 90 to a focus error signal. The focus error signal is generated as a signal called S-shaped curve as shown in FIG. 2 and a portion between the point 310 and the point 314, i.e., a portion being almost linear between the peaks of the S-shape of the focus error signal can be used as an error signal between the objective lens 70 and the position of the focal point. The focus search control and the focus control are conducted by a phase compensation circuit 92 realized by a program control of the DSP 15, a first comparator 94, a second comparator 96, a third comparator 98, a trajectory generating circuit 100 and a selection circuit 102 and in a manner in which the objective lens 70 is moved in the direction of X—X axis by flowing a driving current in the focusing coil 72 of the focus actuator by the focus current driving circuit 104. For a focus search control conducted immediately after an insertion of an MO cartridge into the optical disk drive, the objective lens 70 is positioned at a position sufficiently away from the focusing position as an initial state. For example, in a case where the objective lens 70 is present in the vicinity of the focusing position when it is at the position for which the plate springs 66 are balanced, the objective lens 70 is brought away from the position of the focal point by ordering the focus current driving circuit 104 to flow a driving current of the focusing coil 72. In a case where the objective lens 70 is present at a position sufficiently away from the position of the focal point when it is at the position for which the plate springs 66 are balanced, it is enough that zero (0) is input to the focus current driving circuit 104. An initial current value for this case is designated by the trajectory generating circuit 100 and the selection circuit 102 remains selecting an output of the trajectory generating circuit 100. When the focus search has been started, for example, a cubic function for time is output from the trajectory generating circuit 100 controlling the current of the focusing coil 72 by the focus current driving circuit 104 through the selection circuit 102 such that the objective lens 70 approaches the focusing position. At this moment, since the focus actuator with the focusing coil 72 has a frequency characteristic for outputting a displacement in proportion to a direct current, it is displaced according to a cubic function for an input time period conforming to an order from the trajectory generating circuit 100. Therefore, the objective lens 70 approaches the position of the focal point varying its acceleration smoothly and, after a while, an S-shaped curve of the focus error signal shown in FIG. 2 is output from the focus error signal generating circuit 90 when the objective lens reaches in the vicinity of the position of the focal point. At this moment, the first comparator 94 monitors the focus error signal and, when the focus error signal exceeds a predetermined voltage level indicated by the point 306 shown in FIG. 2, the first comparator 94 outputs to the second comparator 96 an order to start an operation. Then, the second comparator 96 monitors the focus error signal and, when the signal becomes lower than a predetermined voltage level indicated by a point 308, the second comparator 96 outputs to the third comparator 98 an order to start an operation. Then, the third comparator 98 monitors the focus error signal and, when the signal becomes lower than the voltage level corresponding to the focusing position being the point 312, the third comparator 98 outputs a switching order to the selection circuit 102. At this moment, an input to the focus current driving circuit 104 is switched from the output of the trajectory generating circuit 100 to the output of a phase compensation circuit 92. In the phase compensation circuit 92, the focus error signal for the vicinity of the focal point, i.e., a position error signal of the objective lens 70 is input and is applied with a phase compensation filtering process and a gain process such as advancing or delaying the phase such that the control system becomes stable when the loop is closed and, therefore, a focus servo control system is formed that works for the objective lens 70 to be always positioned at the focusing position. As described above, according to the invention, the operations from the start of the focus search to the start of the focus servo control through the detection of the S-shaped curve of the focus error signal are same as those for the conventional apparatus except for the generation of the position trajectory by the trajectory generating circuit 100.

Figure 9A:
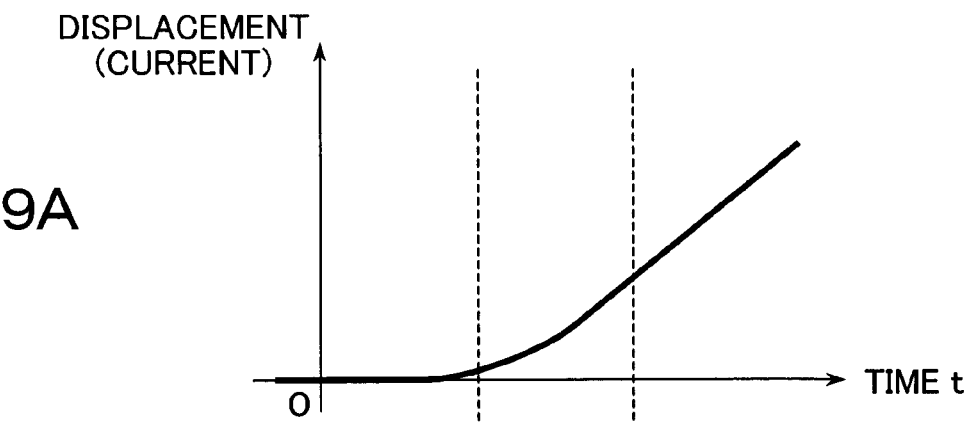
FIGS. 9A to 9C show time charts of the displacement, the velocity and the acceleration according to the focus search of the invention generating a trajectory position being a cubic function with respect to time.
Figure 9B:
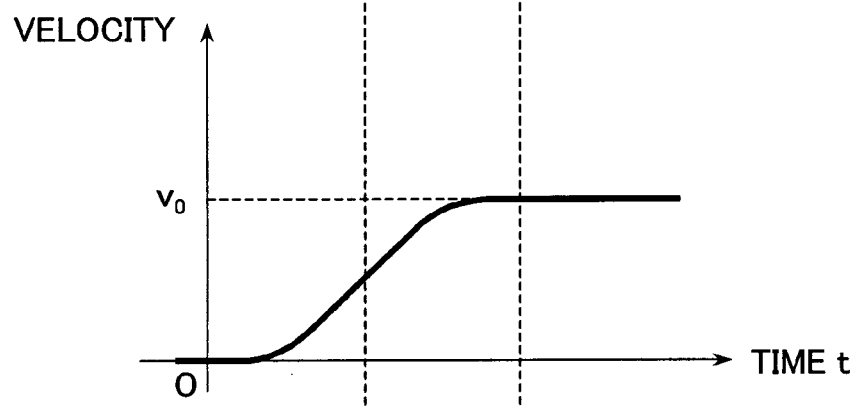
Figure 9C:
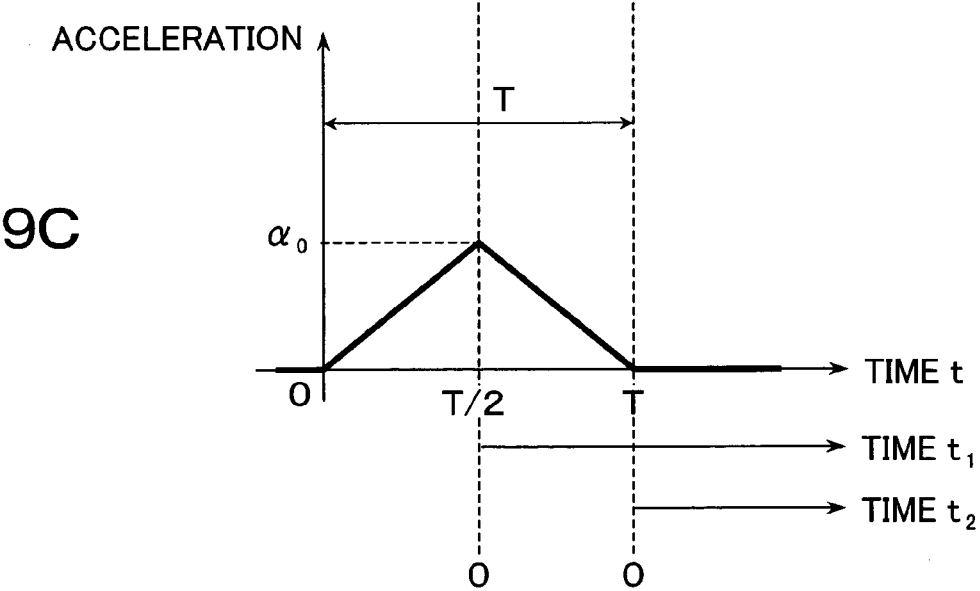
Figure 10A:
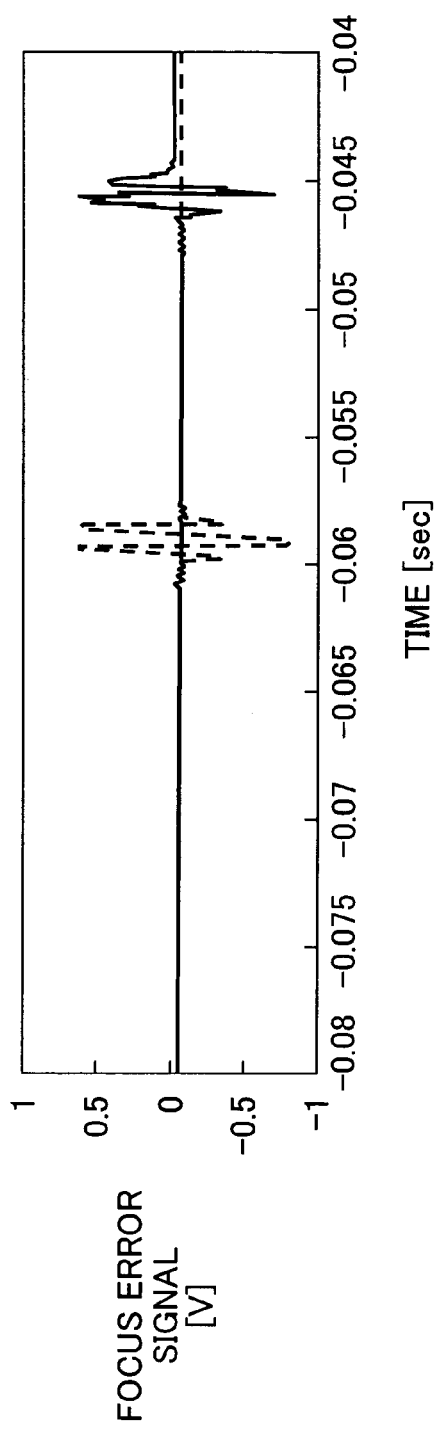
Figure 10B:
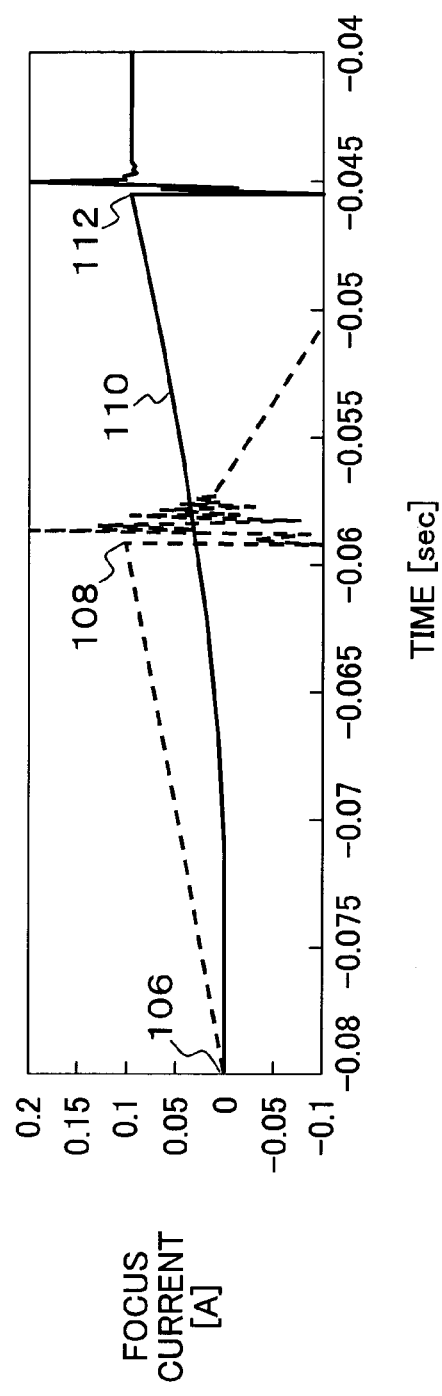

Then, the position trajectory output by the trajectory generating circuit 100 will be described referring to FIGS. 9A to 9C. FIGS. 9A, 9B and 9C show respectively the displacement, the velocity and the acceleration of the objective lens. The final targeted velocity of the objective lens is set at $v_0$ being same as the one for the conventional example and a track that reaches the targeted velocity $v_0$ after a time period T has passed since the start of a focus search, is considered. In order to make the acceleration track be continuously varied against time, a triangular-wave-shaped acceleration track in which the acceleration reaches $\alpha_0$ at a time t=T/2 and the acceleration becomes zero (0) at a time t=T as shown in FIG. 9C, is set. Assuming that a targeted velocity at a time t=T is $v_0$, since another targeted velocity at a time T/2 is $v_0/2$, the acceleration $\alpha_0$ is obtained as $\alpha_0=2v_0/T$ from $\alpha_0 T/2=v_0$. Therefore, the acceleration track, the velocity track and the position trajectory at 0<t<T/2 are respectively as follows.

$$\alpha(t)=(2\alpha_0/T)t=(4v_0/T^2)t$$

$$v(t)=\int a(t)dt=\int (4v_0/T^2)t\, dt=(2v_0/T^2)t^2$$

$$x(t)=\int v(t)dt=\int (2v_0/T^2)t^2 dt=(2v_0/3T^2)\, t^3$$

Next, tracks at a time T/2<t<T are considered. From the fact that the reached velocity and the position are respectively $v(T/2)=v_0/2$, $x(T/2)=v_0T/12$ at a time t=T/2, the acceleration track, the velocity track and the position trajectory are respectively expressed as follows, where $t_1=t-T/2$.

$$a(t_1)=\alpha_0-(4v_0/T^2)t_1=2v_0/T-(4v_0/T^2)t_1$$

$$v(t_1)=v(0)+\int a(t_1)dt_1=v_0/2+(2v_0/T^2)t_1-(2v_0/T^2)t_1^2$$

$$x(t_1)=x(0)+\int v(t_1)dt_1=v_0T/12+(v_0/2)t_1+(v_0/T^2)t_1^2-(2v_0/3T^2)t_1^3$$

Therefore, the reached velocity $v_0$ at the time $t_1=T/2$, i.e., a time $t=T$ becomes the targeted velocity $v_0$. In the time region after this, i.e., T<t, a track of constant velocity is ordered. Therefore, the acceleration track, the velocity track and the position trajectory are respectively expressed as follows, where $t_2=t-T$.

$$\alpha(t_2)=0$$

$$v(t_2)=v(0)=v_0$$

$$x(t_2)=x(0)+\int v(t_2)dt_2=v_0T/2+v_0t_2$$

Summarizing the above, in order to order such tracks, it is enough that a current order expressed by the following equations is placed.

$$i(t)=K(2v_0/3T^2)t^3 (0<t<T/2)$$

$$i(t_1)=K\{v_0T/12+(v_0/2)t_1+(v_0/T)t_1^2-(2v_0/3T^2)t_1^3\}(T/2<t<T, t_1=t-T/2)$$

$$i(t_2)=K\{v_0T/2+v_0t_2\}(T<t, t_2=t-T)$$

The track of the objective lens for a case where a focus search is conducted according to the above position trajectory generation is shown in FIGS. 10A to 10D. FIGS. 10A, 10B, 10C and 10D show respectively the focus error signals, focus actuator currents, the relative positions of the objective lens and the relative velocities of the objective lens. The dotted lines show the tracks created by the conventional focus search controlling apparatus and the solid lines show the tracks created by the focus search controlling apparatus of the invention. According to the apparatus of the invention, first, at a point 112 shown in FIG. 10B being the time at which a focus point is detected, the relative position and the relative velocity shown in respectively FIG. 10C and FIG. 10D both converge on zero (0) and the transition to the focus servo operation is conducted stably. On the contrary, for the conventional apparatus, it can be seen that the relative velocity diverges at a point 108 shown in FIG. 10B being the time at which the a focus point is detected. The focus search operation is started at a point 106 shown in FIG. 10. For the conventional apparatus, the inclination of the focus actuator current from the point 106 to the point 108 is constant. In contrast, for the apparatus of the invention, assuming that T=0.3 ms in FIG. 9, a current control by a cubic function with respect to time is conducted between the point 106 and a point 110 and, then, the current control is shifted to a current control with a constant inclination, same as that for the conventional apparatus. Though variation rates against time, of the focus search currents are same for both of the point 108 at which the focus point is detected in the conventional apparatus and the point 112 at which the focus point is detected in the apparatus of the invention, referring to FIGS. 10C and 10D, it can be seen that the behaviors of the relative displacement and the relative velocity of the objective lens are remarkably different. In this embodiment, the targeted velocity is −25 mm/s as indicated by chain line shown in FIG. 10D. For the conventional apparatus, the relative velocity of the objective lens at the point 108 at which the focus point is detected is −40 mm/s due to the vibration caused by the resonance of the focus actuator. In contrast, for the focus search control apparatus of the invention, it can be seen that the influence of the resonance of the focus actuator does not appear and the relative velocity of the objective lens at the point 112 at which the focus point is detected equals the targeted velocity of −25 mm/s. In this embodiment, the focus search control is conducted by a cubic function with respect to time until the shift to the control at a constant velocity. However, the function may be of, for example, fourth-order or higher and a combination trigonometric functions may be used as the function. Otherwise, any function may be used as far as the second order differential of it is a continuous function.

Figure 11A:
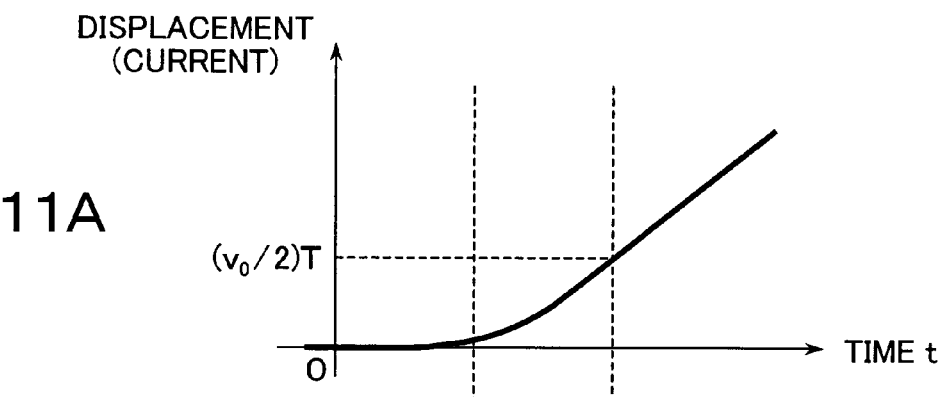
FIGS. 11A to 11C show time charts of the displacement, the velocity and the acceleration according to the focus search of the invention generating a trajectory position being a combination of trigonometric functions for time.
Figure 11B:
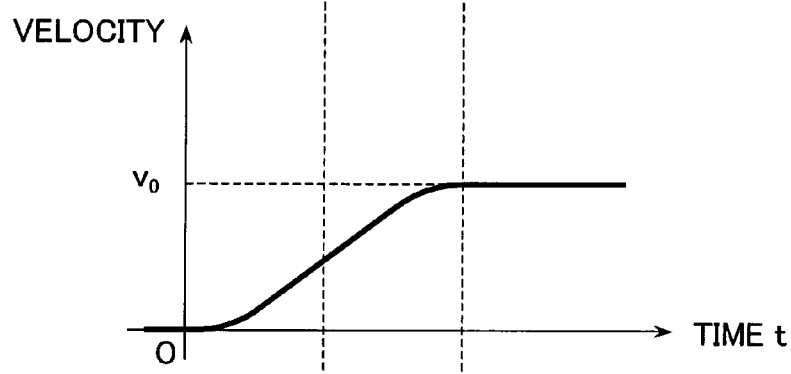
Figure 11C:
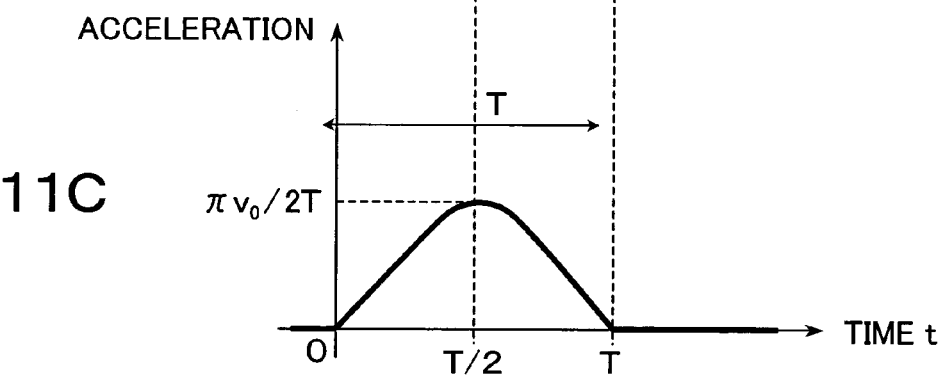

FIGS. 11A to 11C shows a case where a combination of trigonometric functions with respect to time is used for the position trajectory output from the trajectory generating circuit 100. FIGS. 11A, 11B and 11C show respectively the displacement, the velocity and the acceleration of the objective lens. First, the acceleration, the velocity and the displacement at a time t<0 are as follows.

$$\alpha(t)=0$$

$$v(t)=0$$

$$\chi(t)=0$$

The acceleration, the velocity and the displacement at a time $0 \leq t \leq T$ are as follows.

$$\alpha(t)=(\pi v_0/2T)\sin(\pi t/T)$$

$$v(t)=v_0/2-(v_0/2)\cos(\pi t/T)$$

$$\chi(t)=(v_0/2)T-(v_0/2\pi)\sin(\pi t/T)$$

Furthermore, the acceleration, the velocity and the displacement at a time $T \leq t$ are as follows.

$$\alpha(t)=0$$

$$v(t)=v_0$$

$$\chi(t)=(v_0/2)T-v_0t$$

Summarizing the above, it is enough that a current order expressed by the following expressions is placed to order to create such a track.

$$i(t)=0 \qquad (t<0)$$

$$i(t)=K\{(v_0/2)T-(v_0/2\pi)\sin(\pi t/T)\}(t \leq 0 \leq T)$$

$$i(t)=K\{(v_0/2)T+v_0t\}$$

(T<t)

The above embodiment employs as an example an optical disk apparatus that senses a displacement of a focus based on a reflected light beam from an optical disk. However, as light beam from an optical disk. However, as far as an apparatus can sense a relative position error between the objective lens and a target to be followed, the invention can be applied and the application of the invention is not limited to apparatuses utilizing such a focus position error sensing means. Furthermore, the above embodiment employs as an example an optical disk as the storage medium. However, the storage medium of the invention is not limited to this but includes storage mediums such as an optical card and a magnetic desk, and the invention is applicable to optical apparatuses other than optical disk apparatuses.

INDUSTRIAL APPLICABILITY

As described above, according to a focus search control of the invention, since the acceleration of the objective lens can be varied continuously, it is possible to avoid any external force of a high-frequency component from working on the focus actuator and the influence of the resonance of the focus actuator can be minimized. Therefore, it is possible that the velocity of the objective lens at the time at which the focus point is detected can be controlled to equal the targeted velocity and, then, the shift to a stable focus servo operation can be conducted. Therefore, in a storage apparatus such as an optical disk apparatus having a focus search control function of the invention, the quickness and the stability are drastically improved for the focus drawing and the focus servo control following the focus drawing. This contributes considerably to the improvement of the total performance of the apparatus.

The use of the focus control of the invention is not specifically limited but the focus control is suitable for a focus control device having an objective lens as the target of the control, that follows an optical information storage medium represented by, for example, an optical disk, keeping a constant distance from the medium such that an emitted laser beam focuses on the medium, to thereby control the move of the target.

The invention claimed is:

1. A storage apparatus comprising:
    a lens moving unit for moving an objective lens in the direction of its optical axis;
    a focus error detection unit for sensing a targeted position error of the objective lens;
    a focus search control unit for outputting an order to move the objective lens to the vicinity of a targeted position;
    a focus servo control unit for causing the objective lens to follow the targeted position; and
    a trajectory generating unit disposed at the focus search control unit and for generating a position trajectory to move the objective lens such that the objective lens approaches a targeted position gradually, wherein
    the position trajectory output from the trajectory generating unit is defined by a function of at least third order with respect to time.

2. A focus control method of an apparatus comprising a lens moving unit for moving an objective lens in the direction of its optical axis, a focus error detection unit for sensing a targeted position error of the objective lens, a focus search control unit for outputting an order to move the objective lens to the vicinity of a targeted position, and a focus servo control unit for causing the objective lens to follow the targeted position, wherein
    a position trajectory is generated for moving the objective lens such that the objective lens approaches the targeted position gradually, and therein the position trajectory is defined by a function of at least third order with respect to time.

3. A focus control method of an apparatus comprising a focus actuator for moving an objective lens in the direction of its optical axis, a focus error signal detection circuit for detecting the displacement of the objective lens in the vicinity of a focal point, a focus search control unit for outputting an order to move the objective lens to the vicinity of the focal point, and a focus servo control unit for causing the objective lens to follow the position of the focal point, wherein
    a position trajectory is generated for moving the objective lens such that the objective lens approaches a targeted position gradually, and wherein the position trajectory is defined by a function of at least third order with respect to time.

* * * * *